United States Patent
Kuo et al.

(10) Patent No.: US 9,635,073 B1
(45) Date of Patent: Apr. 25, 2017

(54) INTERACTIVE APPLICATIONS IMPLEMENTED IN VIDEO STREAMS

(71) Applicant: Ubitus Inc., Grand Cayman (KY)

(72) Inventors: Jung-Chang Kuo, Taipei (TW); Sheng Lung Yang, Taipei (TW); Wei Hao Peng, Taipei (TW)

(73) Assignee: Ubitus Inc., Grand Cayman (KY)

( * ) Notice: Subject to any disclaimer, the term of this patent is extended or adjusted under 35 U.S.C. 154(b) by 0 days.

(21) Appl. No.: 14/932,252

(22) Filed: Nov. 4, 2015

(51) Int. Cl.
| | | |
|---|---|---|
| *H04L 29/04* | (2006.01) | |
| *H04L 29/06* | (2006.01) | |
| *H04N 21/61* | (2011.01) | |
| *H04N 21/6587* | (2011.01) | |
| *H04N 21/2387* | (2011.01) | |
| *H04N 21/8545* | (2011.01) | |
| *H04N 21/24* | (2011.01) | |
| *H04N 21/854* | (2011.01) | |
| *H04N 21/2343* | (2011.01) | |

(52) U.S. Cl.
CPC ..... *H04L 65/4069* (2013.01); *H04N 21/2387* (2013.01); *H04N 21/234309* (2013.01); *H04N 21/24* (2013.01); *H04N 21/6125* (2013.01); *H04N 21/6587* (2013.01); *H04N 21/8545* (2013.01); *H04N 21/85406* (2013.01)

(58) Field of Classification Search
CPC ............. H04N 21/2387; H04N 21/458; H04N 21/85406; H04L 65/607; H04L 65/601; H04L 65/80; G06F 17/30905

USPC ......................................................... 709/219
See application file for complete search history.

(56) References Cited

U.S. PATENT DOCUMENTS

| | | | |
|---|---|---|---|
| 5,977,992 A | 11/1999 | Branscomb | |
| 2005/0216951 A1* | 9/2005 | MacInnis | H04N 5/4401 725/135 |
| 2010/0287580 A1* | 11/2010 | Harding | G06Q 30/0247 725/14 |
| 2010/0317443 A1* | 12/2010 | Cook | A63F 13/12 463/42 |
| 2011/0197131 A1 | 8/2011 | Duffin et al. | |
| 2014/0006950 A1* | 1/2014 | Chetlur | G06F 3/01 715/719 |
| 2014/0037264 A1 | 2/2014 | Jackson et al. | |
| 2016/0005440 A1 | 1/2016 | Gower et al. | |

OTHER PUBLICATIONS

Phil Haack, "Simulating Http Context for Unit Tests Without Using Cassini nor IIS," Jun. 2005, haacked.com, haacked.com/archive/2005/06/11/simulating_httpcontext.aspx/.*
Yavor Atov, "what is difference between mp4 and mpegts?" Aug. 2012, Stack Overflow, stackoverflow.com/questions/11762464/what-is-difference-between-mp4-and-mpegts.*
U.S. Appl. No. 15/095,987, filed Apr. 11, 2016, Kuo et al.

* cited by examiner

Primary Examiner — Ruolei Zong
(74) Attorney, Agent, or Firm — Mauriel Kapouytian Woods LLP; Lawrence Gabuzda; Michael Mauriel

(57) ABSTRACT

Methods, apparatuses, and computer program products for implementing interactive applications by storing and retrieving streaming video clips and associated metadata are described.

6 Claims, 5 Drawing Sheets

INTERACTIVE APPLICATIONS IMPLEMENTED IN VIDEO STREAMS

BACKGROUND

Interactive applications, such as games, can be computationally intensive. Particularly for certain kinds of interactive applications, such as interactive multimedia applications, a major component of this high computational load is the need to generate video and audio in response to user inputs. Further, the load is multiplied by the number of users, since the same video and audio may need to be generated separately for each of the multiple users of a given application.

When such applications are hosted on servers, for example cloud-based servers, one result can be a need for large numbers of servers, which are costly to acquire, update, and maintain.

There is a need for a better solution for hosting computationally intensive interactive applications, such as games.

SUMMARY

Embodiments of the present invention convert multimedia computer program outputs to a series of streaming video clips that can then be distributed worldwide through the video streaming infrastructure consisting of Internet Data Centers (IDCs) and a Content Delivery Network (CDN).

Further, in some embodiments, the video clips are tagged with metadata to facilitate playback. Metadata can include, for example, an identifier and trigger information. The identifier can be a unique identifier for each video clip. The trigger information can specify the identifier of the next clip to be played, possibly as a function of the current user input or other conditions.

In general, embodiments of the present invention include a video clip production process and an interactive playback process.

In the production process, a user (or, in some variations, a simulated, "robot" user) interacts with a conventional interactive computer program. In response to the user interaction, the computer program produces raw video and sound data. The user input or other event that triggered the production of the particular video and sound data is stored. The particular video and sound data associated with the trigger condition are then converted to streaming video clips. The clips are tagged with metadata, including for example an ID, the trigger condition or playback event, and a length. In some embodiments, the clips are then sent via a Content Delivery Network to selected Internet Data Centers to support one or more interactive applications.

In the playback process, in certain embodiments, for example an embodiment that supports the playing of an interactive game, a first video clip is played. At the conclusion of the playing of the first video clip (or, in some embodiments, at any time during the playing of the first video clip), the metadata is consulted to identify the trigger condition or conditions that will trigger the playing of a next video clip. Upon detection of the trigger condition (for example a user pushing a certain button), the next video clip is played. Playback continues in this manner until a last video clip is played based on a last trigger condition.

In some embodiments, playback occurs in a server, such as a cloud-based streaming server, and the content is streamed to the user from the server. In other embodiments, at playback the content is streamed to the user via the CDN and IDC.

DETAILED DESCRIPTION

Embodiments of the present invention provide production and playback of multi-media information as streaming video clips for interactive real-time media applications.

Figure 1:
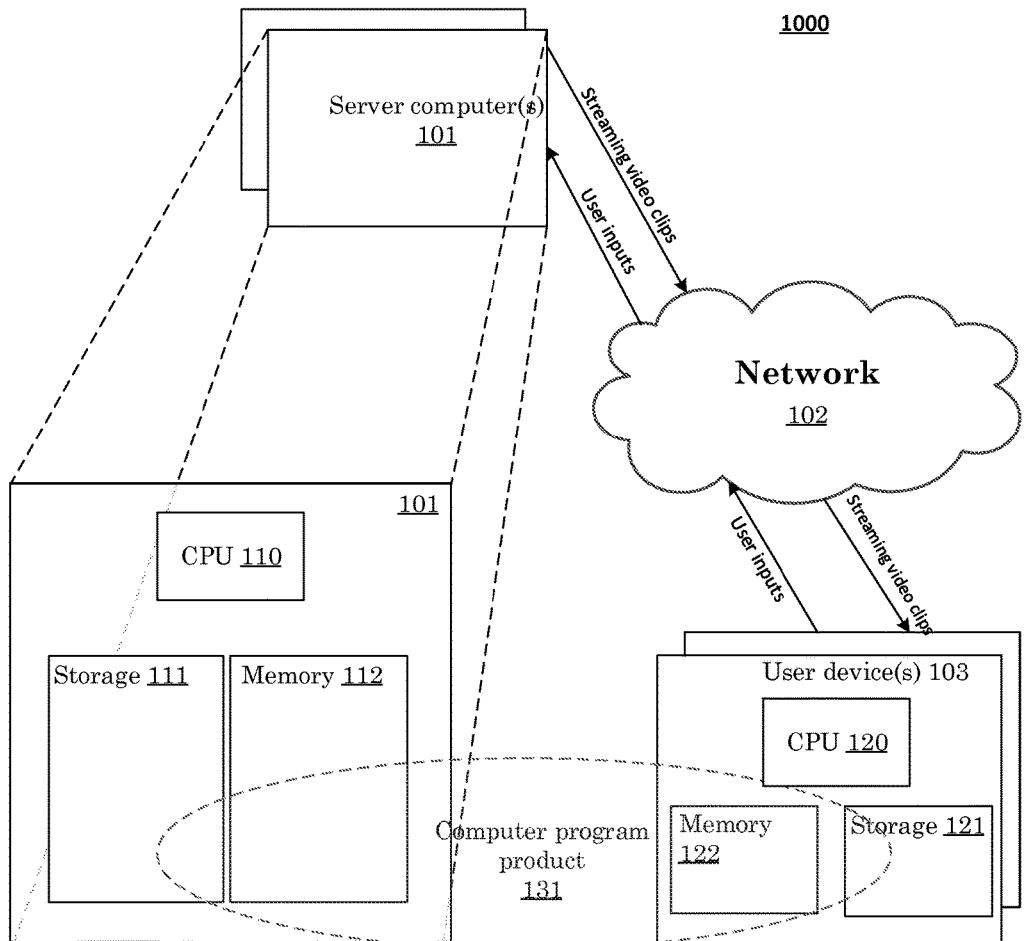
FIG. 1 is a block diagram of a distributed client-server computer system supporting interactive real-time multimedia applications according to one embodiment of the present invention.

FIG. 1 is a block diagram of a distributed client-server computer system 1000 supporting interactive real-time multimedia applications according to one embodiment of the present invention. Computer system 1000 includes one or more server computers 101 and one or more user devices 103 configured by a computer program product 131. Computer program product 131 may be provided in a transitory or non-transitory computer readable medium; however, in a particular embodiment, it is provided in a non-transitory computer readable medium, e.g., persistent (i.e., non-volatile) storage, volatile memory (e.g., random access memory), or various other well-known non-transitory computer readable mediums.

User device 103 includes central processing unit (CPU) 120, memory 122 and storage 121. User device 103 also includes an input and output (I/O) subsystem (not separately shown in the drawing) (including e.g., a display or a touch enabled display, keyboard, d-pad, a trackball, touchpad, joystick, microphone, and/or other user interface devices and associated controller circuitry and/or software). User device 103 may include any type of electronic device capable of providing media content. Some examples include desktop computers and portable electronic devices such as mobile phones, smartphones, multi-media players, e-readers, tablet/touchpad, notebook, or laptop PCs, smart televisions, smart watches, head mounted displays, and other communication devices.

Server computer 101 includes central processing unit CPU 110, storage 111 and memory 112 (and may include an I/O subsystem not separately shown). Server computer 101 may be any computing device capable of hosting computer product 131 for communicating with one or more client computers such as, for example, user device 103, over a network such as, for example, network 102 (e.g., the Internet). Server computer 101 communicates with one or more client computers via the Internet and may employ protocols such as the Internet protocol suite (TCP/IP), Hypertext Transfer Protocol (HTTP) or HTTPS, instant-messaging protocols, or other protocols.

Memory 112 and 122 may include any known computer memory device. Storage 111 and 121 may include any known computer storage device.

Although not illustrated, memory 112 and 122 and/or storage 111 and 121 may also include any data storage equipment accessible by the server computer 101 and user device 103, respectively, such as any memory that is removable or portable, (e.g., flash memory or external hard disk drives), or any data storage hosted by a third party (e.g., cloud storage), and is not limited thereto.

User device(s) 103 and server computer(s) 101 access and communicate via the network 102. Network 102 includes a wired or wireless connection, including Wide Area Networks (WANs) and cellular networks or any other type of computer network used for communication between devices.

In the illustrated embodiment, computer program product 131 in fact represents computer program products or computer program product portions configured for execution on, respectively, server 101 and user device 103. A portion of computer program product 131 that is loaded into memory 112 configures server 101 to record and play back interactive streaming video clips in conformance with the inventive requirements further described herein. The streaming video clips are played back to, for example, user device 103, which supports receiving streaming video, such as via a browser with HTML5 capabilities.

Figure 2:
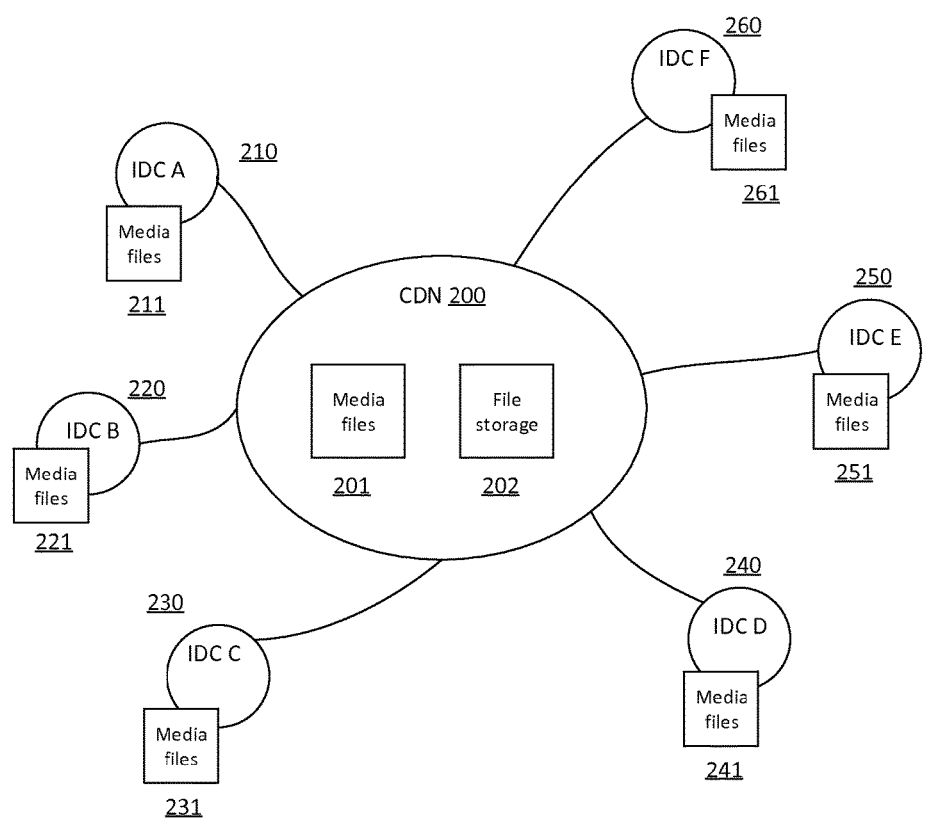
FIG. 2 is a block diagram of the video streaming infrastructure comprising a Content Delivery Network (CDN) and multiple Internet Data Centers (IDCs), being utilized by embodiments of the present invention to distribute video clips.

FIG. 2 illustrates an example of the video streaming infrastructure 2000, being utilized by some embodiments of the present invention to distribute video clips. As shown, video streaming infrastructure 2000 comprises Content Delivery Network (CDN) 200 and Internet Data Centers (IDCs) 210-260.

Media files 201 are initially stored in file storage 202. Media files 201 are then distributed via CDN 200 to IDCs 210-260. After a file is distributed, each respective IDC has a local copy of the distributed media file. The respective local copies are then stored as media file copies 211-261. Each IDC 210-260 then serves streaming media, such as video, to users in the geographic vicinity of the respective IDC, in response to user requests. Media file copies 211-261 may be periodically updated.

In some embodiments of the present invention, video streaming infrastructure 2000 is used to distribute the video clips produced by the inventive process disclosed herein. That is, for example, the inventive video clips are stored as media files 201 in file storage 202, and then distributed via CDN 200 to IDCs 210-260, where they are available for playback to users as streaming video.

In other embodiments, the inventive video clips are distributed directly from, for example, a server or servers, such as cloud-based servers, without making use of video streaming infrastructure 2000.

Figure 3:
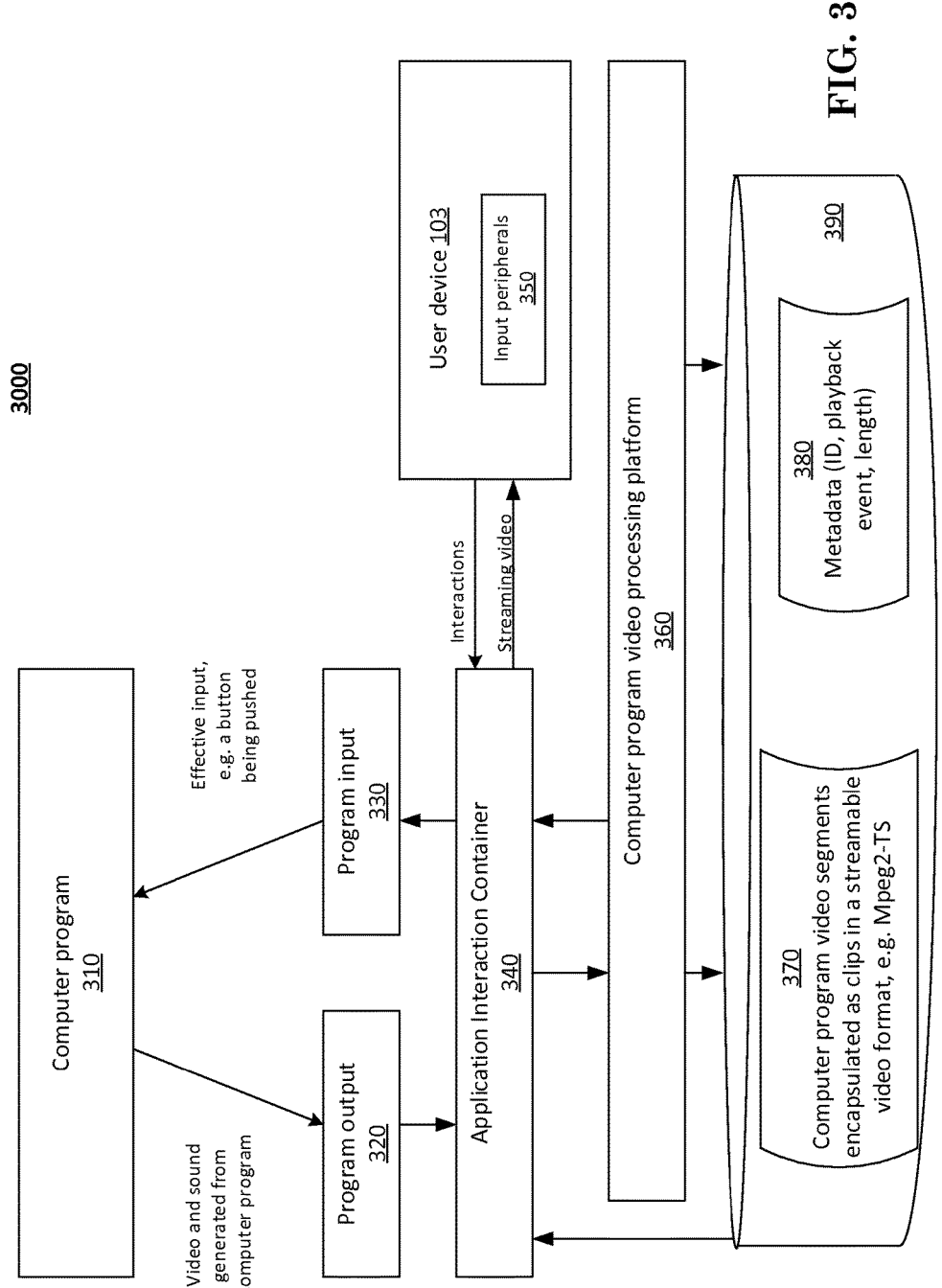
FIG. 3 is a diagram depicting the interactive video clip production and playback system according to an embodiment of the present invention.

FIG. 3 is a high-level block diagram of a system 3000 for producing and storing interactive video clips tagged with metadata, and for delivering interactive video to a user device, according to embodiments of the present invention. System 3000 may be realized as hardware modules, or software modules, or a combination of hardware and software modules. In some embodiments, at least part of system 3000 comprises software running on a server, such as server 101.

In the illustrated embodiment, in addition to producing and storing interactive video clips tagged with metadata, system 3000 performs additional related functions. For example, in this embodiment system 3000 is also capable of playing back prestored video clips and is additionally capable of streaming video to a user in response to user interactions without first storing the video as a video clip. In alternative embodiments, one or more of these functions can be provided by a separate system or systems.

In FIG. 3, computer program 310 can be, for example, an interactive multimedia application program. For example, computer program 310 can be a gaming application program. Computer program 310 produces program output 320 in response to program input 330.

In some embodiments, program output 320 comprises raw video and sound outputs. In some embodiments, program output 320 comprises a video rendering result.

In some embodiments, program input 330 comprises control messages based on indications of user input interactions, such as a user pushing a button, selecting an item on a list, or typing a command. Such user input interactions can originate from input peripherals 350, which can be peripherals associated with a user device, such as user device 103. Specific user device-associated peripherals can include a joystick, a mouse, a touch-sensitive screen, etc. In some embodiments, input peripherals 350 can be collocated with a remote user device 103 and communicate with other elements of the system via a network. Although labeled as "peripherals," those skilled in the art will understand that input devices/elements such as peripherals 350 may, in particular embodiments, include input elements that are built into, i.e., part of, user device 103 (e.g., a touchscreen, a button, etc.) rather than being separate from and plugged into, user device 103.

In some embodiments, input peripherals 350 are "robot" entities that produce sequences of inputs that simulate the actions of a real user. Such robot entities can be used to "exercise" the system and cause it to produce many (or even all) possible instances of program output 320. The purpose of "exercising" system 3000 in this manner may be to, for example, cause it to produce and store at least one copy of each video clip associated with program output 320.

Application Interaction Container 340 provides a runtime environment to run computer program 310. In embodiments of the present invention, Application Interaction Container 340 detects and intercepts user inputs generated by input peripherals 350 and delivers the intercepted user inputs to computer program 310 in the form of program input 330.

Application Interaction Container 340 also intercepts raw video and sound generated as program output 320 and, utilizing the services of computer program video processing platform, 360, converts the raw video and sound to a streaming video format, and then stores the converted video and sound as one or more video segments or clips 370 in database 390. Each clip represents the audio and video program output produced in response to particular trigger conditions (or playback events), where the set of possible trigger conditions comprise, for example, particular items of program input 330. In some embodiments, the raw video and sound are converted into a multi-media container format. In some embodiments, the raw video and sound are converted into the format known as MPEG2-Transport Stream (MPEG2-TS).

As the video clips 370 are generated, they are also tagged with a set of attributes 380 (also referred to herein as "metadata"), comprising, for example, a clip ID, a playback event, and a length. The attributes in metadata 380 are stored in association with corresponding video clips 370 in database 390. The stored clips 370 can then be used for future playback. The stored, tagged video clips 370 can be re-used by the same user or a different user. Potentially, a given clip 370 can be reused by thousands of users interacting with computer program 310 on a shared server or set of servers.

For example, the next time a given playback event arises (based, for example, on the detection of a particular user input, either from the same user or a different user), the stored video clip 370 tagged with that event can be played, thus avoiding the need to regenerate the corresponding raw video and sound. For some applications, this can result in a substantial savings of computer processing power. See description of playback process below for further details.

As noted above, in the illustrated embodiment, system 3000 can also play back prestored video clips. For example, based on a user interaction via input peripherals 350 resulting in program input 330, computer program 310 may determine that a certain prestored clip 370 with metadata 380 corresponding to the user interaction is available and is the appropriate response to the user interaction. The matching clip 370 can then be retrieved from storage and streamed, for example according to a multi-media container format, such as MPEG2-TS, to user device 103.

As further noted above, in the illustrated embodiment, system 3000 can also stream video to a user in response to user interactions even if the video is not currently stored as a streaming video clip 370. For example, based on a user interaction via input peripherals 350 resulting in program input 330, computer program 310 may determine that a certain video output is the appropriate response to the user interaction, but that no corresponding clip 370 is available. The required video can then be generated by computer program 310 as raw video output 320. Application Interaction Container 340 then intercepts the program output 320 and, utilizing the services of computer program video processing platform 360, converts the raw video to a streaming format, according to, for example, a multi-media container format, such as MPEG2-TS, and sends the streaming video to user device 103. Advantageously, the streaming video can simultaneously be recorded, encapsulated as a video clip 370, and stored for future use along with appropriate metadata 380.

Figure 4:
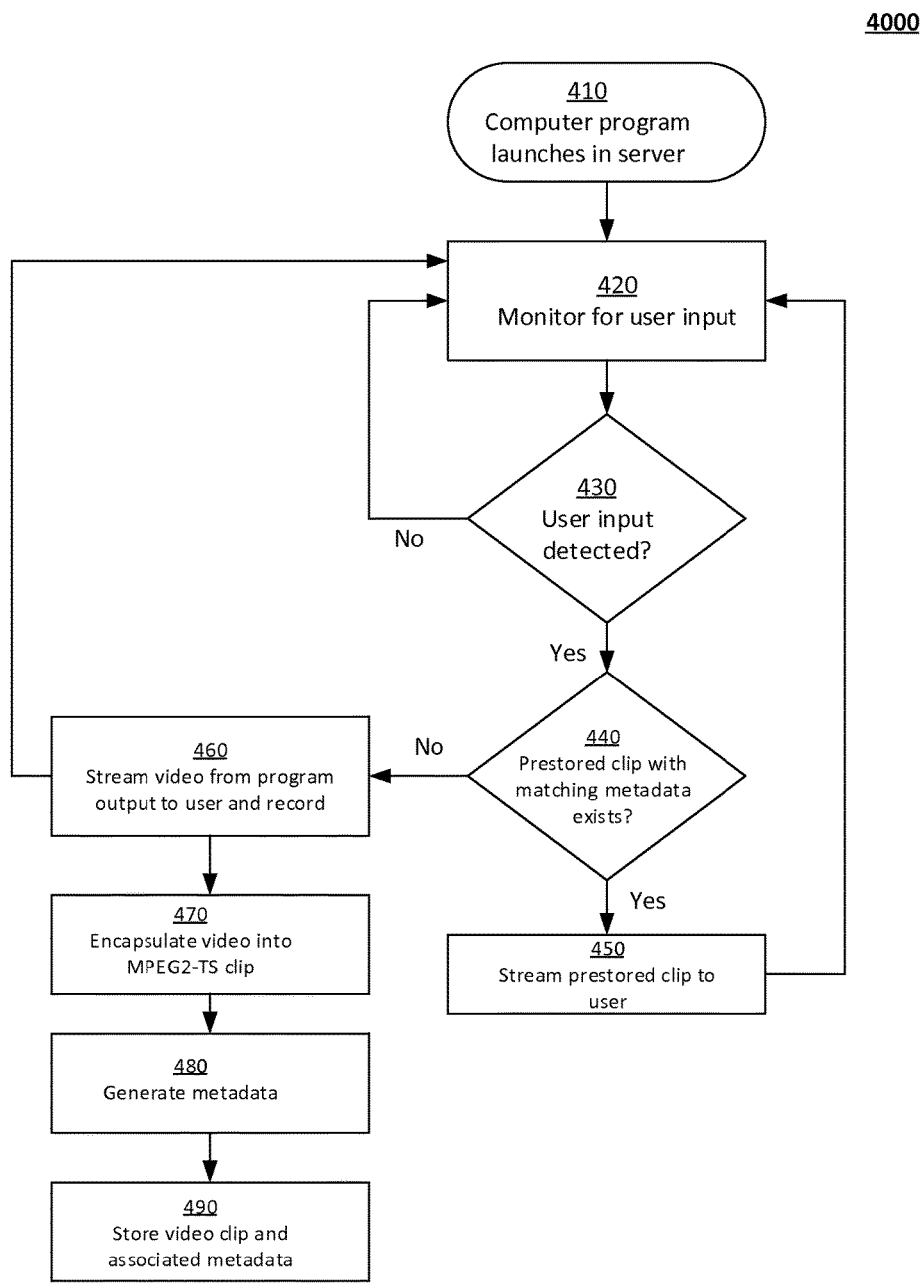
FIG. 4 is a flow diagram of a video clip production and playback process according to an embodiment of the present invention.

FIG. 4. illustrates a process 4000 for producing, storing, and playing interactive video clips and related metadata, according to embodiments of the present invention. In some embodiments, process 4000 can also support other related functions, such as, for example, streaming video to a user without first storing the video as a video clip.

At step 410, a computer program launches in a server, such as server 101. The server can be, for example, a cloud-based server. The server can be, for example, a game server. The computer program can be, for example, an interactive multimedia application program, such as, for example, a game application.

At step 420, the process monitors for user input.

At decision box 430, if no user input is detected, the process returns to step 420 and continues to monitor for user input. If user input is detected, control passes to decision box 440.

At decision box 440, if a prestored video clip with matching metadata (i.e., metadata corresponding to the user input) exists, control passes to step 450, where the prestored video clip is streamed to the user. Control then returns to step 420 and the process continues monitoring for user input.

If, at decision box 440, no prestored clip with matching metadata is found, control passes to step 460. At step 460, a video segment from the program output responsive to the user input is streamed to the user. Simultaneously, the video segment is recorded in preparation for the creation of a corresponding video clip. At step 470, the recorded video is encapsulated into a video clip in a streaming format. For example, the streaming format can be a multi-media container format such as MPEG2-TS.

At step 480, metadata associated with the video clip (e.g. clip ID, playback event or trigger, length) is generated.

At step 490, the video clip and its associated metadata are stored for future use. For example, the video clip can be used in the future by a playback process when a trigger corresponding to the stored metadata for the clip is encountered. By using the stored video clip, the playback process can then avoid the need for the computer program to regenerate the video segment corresponding to the stored video clip.

Video segments can continue to be recorded, encapsulated into clips in a streaming format, and stored with associated metadata until, for example, the game ends.

Note that, in the case where process 4000 is running on a server, for example a cloud-based server, it may actually be handling multiple users, possibly many users, simultaneously. In such a case, it is entirely possible that a given video segment has already been recorded, encapsulated and stored as a video clip 370, with corresponding metadata 380 in the course of a previous user's interaction with process 4000. In such a case, it should not be necessary to record the corresponding segment again. Rather, the video clip can be retrieved from the set of previously stored clips, based on the metadata, which can include a unique ID.

Figure 5:
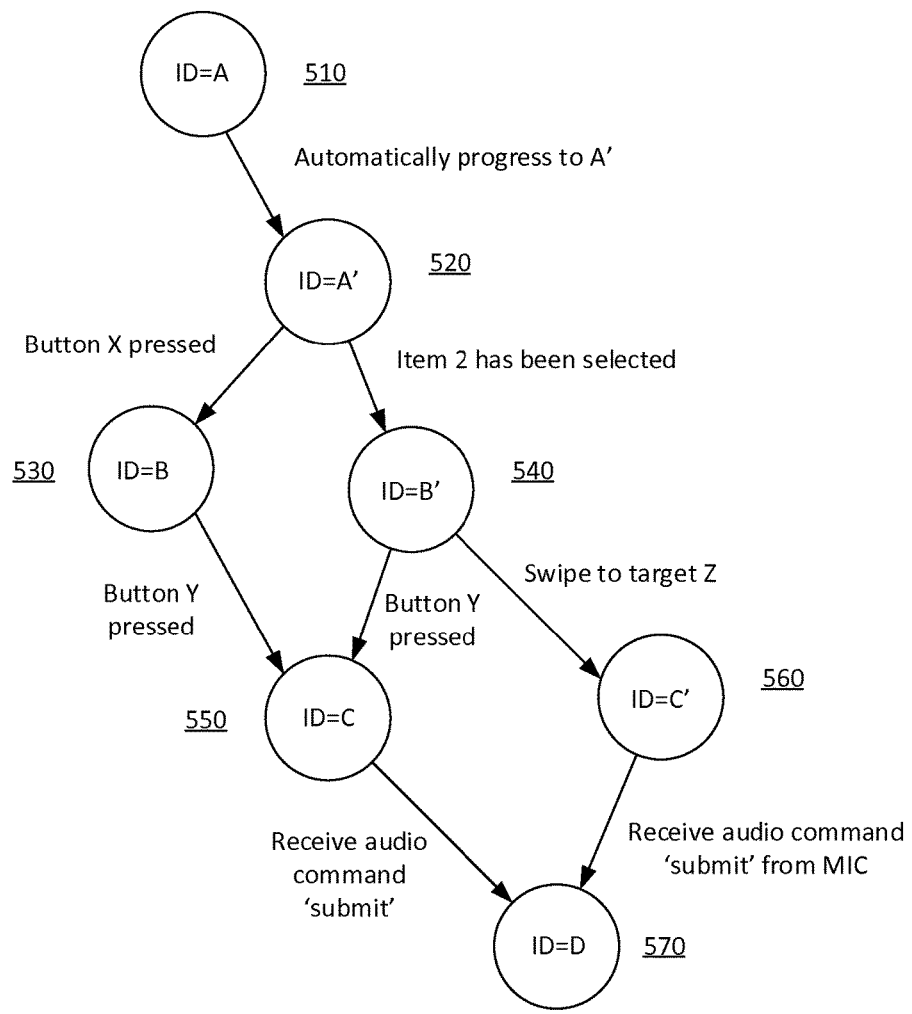
FIG. 5 depicts a graph-structured set of video clips, according to an embodiment of the present invention.

FIG. 5 displays an example graph-structured set 5000 of video clips and associated metadata, used in a playback process according to embodiments of the present invention. These clips may be, for example, video clips 370 and associated metadata 380 produced by the system 3000 of FIG. 3 and/or by the process 4000 of FIG. 4. In a playback process, video clips 370 are streamed from a server, such as server computer 101 or a server associated with an Internet Data Center, such as IDC 210. Video clips 370 are received and viewed at a user device, such as user device 103, which is equipped with suitable capabilities, such as a browser supporting HTML5.

Each interactive multimedia application or portion of an application may have associated with it a playback video clip set of a form similar to video clip set 5000, also referred to as a "metadata playlist." For example, each level of a multilevel game can have its own metadata playlist. As described above, the metadata associated with each video clip 370 is learned as the application executes in response to real or "robot" user input. Therefore, at the same time, the metadata playlist 5000 is also learned. This is because the metadata playlist is the collection of video clips 370, linked according to metadata 380, for the particular application or portion of an application.

In the example of FIG. 5, the video clips are represented by circles, each having an ID. For example, video clip 510 is labeled with ID=A. Arrows represent "playback events" or trigger conditions that cause the playback process 5000 to progress in the direction of the arrow. For example, if video clip 520 is playing and Button X is pushed, the playing of video clip 520 stops and video clip 530 starts. If, on the other hand, the user selects "item 2" while video clip 520 is playing, the process transitions instead to video clip 540. If video clip 530 is playing and button Y is pressed, the process transitions to and plays video clip 550. Also, if video clip 540 is playing and button Y is pressed, the process transitions to and plays video clip 550. If video clip 540 is playing and the user swipes to "target Z," then the process transitions to and begins playing video clip 560. If either of video clip 560 or 550 is playing and the audio command "submit" is received from the microphone ("MIC"), the process transitions to and begins playing video clip 570. Illustrating a somewhat different kind of trigger, when video clip 510 is finished playing, the process automatically progresses to the video clip labeled A', namely video clip 520.

Optionally, a caching mechanism can be employed to help smooth playback of the video clips.

In some embodiments of the present invention, the video delivered from a server to a user device is a mix of pre-calculated video (stored and re-played video clips) and real-time generated video streams (for video that has not yet been stored as video clips with metadata).

In the above description, reference is made to streaming multi-media container formats, such as MPEG2-TS. It should be understood that embodiments of the present invention are not limited to MPEG2-TS, but rather can employ any of a wide variety of streaming container formats, including but not limited to 3GP, ASF, AVI, DVR-MS, Flash Video (FLV, F4V), IFF, Matroska (MKV), MJ2, QuickTime File Format, MPEG program stream, MP4, Ogg, and RM (RealMedia container). Embodiments that operate without a standardized container format are also contemplated.

Although a few exemplary embodiments have been described above, one skilled in the art will understand that many modifications and variations are possible without departing from the spirit and scope of the present invention. Accordingly, all such modifications and variations are intended to be included within the scope of the claimed invention.

What is claimed is:

1. A method for producing video for use in an interactive multimedia application, comprising:
   launching an interactive multimedia application program in a server;
   monitoring for user input;
   upon detection of a first user input from a first user, searching for a prestored streaming video clip having metadata comprising a playback event corresponding to the first user input;
   if finding the prestored streaming video clip having metadata comprising a playback event corresponding to the first user input, then streaming the identified streaming video clip to the first user; and
   if not finding the prestored streaming video clip having metadata comprising a playback event corresponding to the first user input, then streaming video from an output of the multimedia application program to the first user, encapsulating the video from the output of the multimedia application program into a streaming video clip and storing the encapsulated video along with associated metadata.

2. The method of claim 1, wherein the streaming video clip is encapsulated according to a multi-media container format.

3. The method of claim 2, wherein the multi-media container format is MPEG2-TS.

4. The method of claim 1, wherein the first user input originates from a remote user device.

5. The method of claim 1, wherein the first user input originates from a simulated ("robot") entity.

6. The method of claim, 1, wherein the stored encapsulated streaming video clip is retrieved and re-used to deliver video to at least two different users.

* * * * *